United States Patent
Barness et al.

(10) Patent No.: US 9,812,839 B2
(45) Date of Patent: Nov. 7, 2017

(54) ARBITRARY PULSE SHAPING IN HIGH PEAK POWER FIBER LASERS

(71) Applicants: Doron Barness, Kiryat Ono (IL); Eitan Emanuel Rowen, Modiin (IL); Jacob Lasri, Hod Hasharon (IL); Eran Inbar, Tel-Aviv (IL); Eran Tal, Petach Tikva (IL)

(72) Inventors: Doron Barness, Kiryat Ono (IL); Eitan Emanuel Rowen, Modiin (IL); Jacob Lasri, Hod Hasharon (IL); Eran Inbar, Tel-Aviv (IL); Eran Tal, Petach Tikva (IL)

(73) Assignee: V-Gen Ltd. (IL)

( * ) Notice: Subject to any disclaimer, the term of this patent is extended or adjusted under 35 U.S.C. 154(b) by 0 days.

(21) Appl. No.: 14/636,635

(22) Filed: Mar. 3, 2015

(65) Prior Publication Data
US 2015/0249316 A1    Sep. 3, 2015

Related U.S. Application Data

(60) Provisional application No. 61/946,920, filed on Mar. 3, 2014.

(51) Int. Cl.
*H01S 3/067* (2006.01)
*H01S 3/0933* (2006.01)
*H01S 3/10* (2006.01)
*H01S 3/094* (2006.01)
*H01S 3/06* (2006.01)
*H01S 3/00* (2006.01)

(52) U.S. Cl.
CPC ........ *H01S 3/10084* (2013.01); *H01S 3/0057* (2013.01); *H01S 3/0623* (2013.01); *H01S 3/06754* (2013.01); *H01S 3/0933* (2013.01); *H01S 3/094023* (2013.01); *H01S 3/094042* (2013.01); *H01S 3/094076* (2013.01); *H01S 3/094088* (2013.01); *H01S 3/10023* (2013.01); *H01S 3/0078* (2013.01); *H01S 2301/03* (2013.01)

(58) Field of Classification Search
CPC ............... H01S 2301/03; H01S 3/0078; H01S 3/06754; H01S 3/0933
See application file for complete search history.

(56) References Cited

U.S. PATENT DOCUMENTS

2009/0067455 A1    3/2009  Murison et al.
2010/0316072 A1   12/2010  Deladurantaye

FOREIGN PATENT DOCUMENTS

WO    2004-013980 A2    2/2004

OTHER PUBLICATIONS

Communication from European Patent Office regarding European Search Report for EP Application No./Patent No. 15000599.9-1556 / 2916399 dated Sep. 9, 2015.

*Primary Examiner* — Marcia Golub-Miller
(74) *Attorney, Agent, or Firm* — Vedder Price P.C.

(57) ABSTRACT

Seeder for use with a fiber laser for generating an arbitrary shaped pulse, comprising an amplified spontaneous emission (ASE) source, a spectral filter and an arbitrary waveform generator (AWG) modulator, the ASE source for generating a continuous wave (CW) broadband pulse, the spectral filter being coupled with the ASE source for narrowing the CW broadband pulse, and the AWG modulator being coupled with the spectral filter for shaping the narrowed CW broadband pulse to an arbitrary pulse shape.

21 Claims, 3 Drawing Sheets

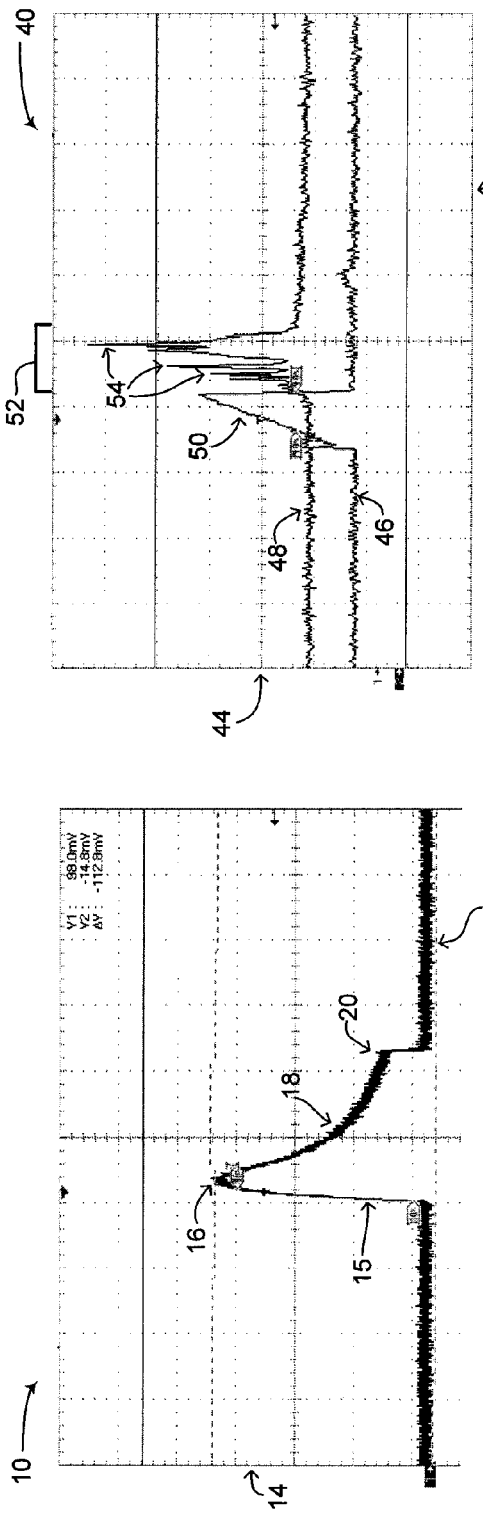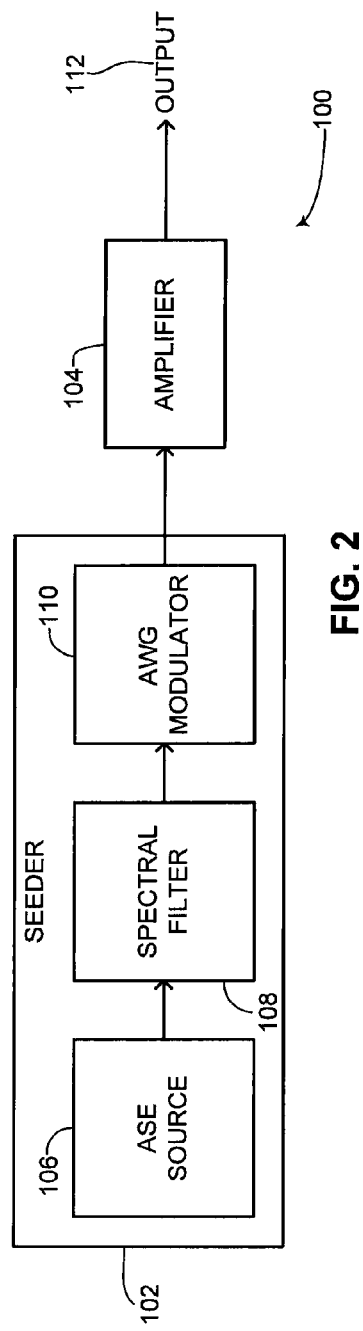
FIG. 1A
PRIOR ART
FIG. 1B
PRIOR ART
FIG. 2

ARBITRARY PULSE SHAPING IN HIGH PEAK POWER FIBER LASERS

FIELD OF THE DISCLOSED TECHNIQUE

The disclosed technique relates to fiber lasers in general, and to systems and methods for achieving high peak power laser pulses in fiber lasers and fiber amplifiers with arbitrary waveforms, in particular.

BACKGROUND OF THE DISCLOSED TECHNIQUE

Fiber lasers have many industrial applications, such as micromachining, which require laser pulses having a high peak power on the range of tens of kilowatts or having high pulse energies in the millijoule range. In a fiber laser setup, laser pulses with a high peak power can be achieved by subjecting short nanosecond (herein abbreviated ns) pulses with low pulse repetition rates (herein abbreviated PRR) to high gain amplifiers. However, in fiber laser setups where longer duration laser pulses are required, such as in the range of tens of nanoseconds up to hundreds of nanoseconds, as the pulse width is increased, these high gain amplifiers tend to reach gain saturation due to the limit of energy extraction from the gain medium. The gain medium (i.e. the optical fiber) thus reduces the maximum achievable energy for these laser pulses. In general, gain saturation restricts the sustained peak power over longer time durations.

Besides the issue of gain saturation, fiber lasers can exhibit non-linear effects which can interfere with the generated laser pulses and can cause internal damage to the fiber laser. Non-linear effects, such as stimulated Raman scattering (herein abbreviated SRS) and stimulated Brillouin scattering (SBS) occur in fiber lasers due to interactions between the medium of the fiber laser (i.e., fiber optics) and the generated laser pulses. SRS and SBS manifest themselves as additional laser energy travelling inside the fiber laser which may have a wavelength either higher or lower than the wavelength of the generated laser pulses. As the pulse width of the generated laser pulse increases, the above mentioned non-linear effects become more pronounced in fiber lasers, specifically SBS, which generates shorter wavelength pulses travelling backwards along the gain medium. Internal components in the fiber laser can then be burned and damaged and thus the achievable peak power of the generated laser pulses becomes limited. In fiber lasers, pulses having high peak power and a pulse width of longer than about 5 ns are inevitably accompanied by SBS, which usually manifests itself as an abrupt backwards pulse which is amplified to a high peak power level. Such a pulse can often result in internal damage to the fiber laser. Whereas gain saturation and non-linear effects are not causally related, both phenomena occur under similar conditions. Limited gain produces gain saturation (i.e., gain depletion) whereas high peak power provokes non-linear effects.

Methods and systems are known in the art for compensating for non-linear effects in fiber lasers. For example, SBS occurs in a pronounced way in fiber lasers when there is an increase in the interaction between the medium and the generated light pulses. One way for limiting this interaction and thus raising the threshold for SBS is to use optical fibers with larger core diameters. A drawback of such a fiber laser however is that larger core diameters do not enable single mode beams to be generated. In industrial applications using fiber lasers, where pulse shaping is required, such higher modes (i.e., not single mode) limit the beam quality and thus the performance in terms of resolution spot size.

Fiber lasers, especially those designed as master oscillator power amplifiers (herein abbreviated MOPA), usually include a seeder, also known as a seed laser, which is the initial laser in the design whose output is amplified to generate higher peak power laser pulses. SBS becomes more pronounced when the wavelength of the laser pulses generated by the seeder is narrow enough such that a single frequency (i.e. a linewidth) interacts with the optical fiber's refraction index and forms an acoustic shockwave which ignites an SBS pulse. Another known way of limiting the intensity of SBS is to prevent the laser pulses generated by SBS by controlling the spectral characteristics of the seeder. One known technique is to phase modulate the seeder such that its wavelength is modulated rapidly enough, thereby preventing the long interaction between the gain medium and the SBS pulse. Such techniques however involve higher costs and complexity in fiber laser design.

As mentioned above, high peak powers in fiber lasers leads to non-linear effects such as SBS. High intensity levels of SBS pulses can cause laser damage in high power fiber lasers therefore low threshold levels for SBS limit the achievable peak power in such systems. Furthermore, pulse shaping using slowly rising leading edged pulses further reduces the SBS threshold making pulse shaping even harder to achieve. Reference is now made to FIG. 1A, which is a graph, generally referenced 10, showing a rectangular pulse after amplification exhibiting gain depletion, as is known in the prior art. Graph 10 shows the voltage of a laser pulse 15 over time, generated by a fiber laser. An X-axis 12 of graph 10 represents time in nanoseconds, whereas a Y-axis 14 of graph 10 represents voltage in millivolts, substantially representing the peak power of laser pulse 15. Laser pulse 15 was generated by a seeder as a rectangular pulse and was amplified in a gain amplifier for increasing its peak power. As seen, laser pulse 15 peaks at a peak 16 but then quickly tapers off in a downward slope 18 and reaching a local minimum 20 before ending. Downward slope 18 is due to saturation of the medium, also known as gain depletion.

Reference is now made to FIG. 1B, which is a graph, generally referenced 40, showing an SBS generated pulse produced by amplifying a linear rising pulse, as is known in the prior art. Graph 40 shows the voltage of two laser pulses over time, generated by a fiber laser. An X-axis 42 of graph 40 represents time in nanoseconds, whereas a Y-axis 44 of graph 40 represents voltage in millivolts, substantially representing the peak power of the laser pulses. A first laser pulse 46 represents a linear rising pulse 50 produced by a seeder in a fiber laser. A second laser pulse 48 represents the amplification of first laser 46 in a fiber laser, where second laser pulse 48 shows the SBS driven laser pulse. As seen in a section 52, second laser pulse 48 shows extremely unstable, noisy behavior demarcated by local peaks 54. Local peaks 54, which represent significantly high peak power compared to the peak power of linear rising pulse 50, travel backwards in a fiber laser thus endangering the laser and its components. Linear rising pulse 50 is thus not a good candidate for pulse shaping at high peak power.

What is needed is thus a fiber laser configuration in which pulse shaping at high peak power can be achieved while significantly reducing any limiting effects of non-linear effects in fiber lasers such as SBS.

SUMMARY OF THE DISCLOSED TECHNIQUE

It is an object of the disclosed technique to provide a novel seeder for use with a fiber laser which overcomes the disadvantages of the prior art. In accordance with the disclosed technique, there is thus provided a seeder for use with a fiber laser for generating an arbitrary shaped pulse. The seeder includes an amplified spontaneous emission (ASE) source, a spectral filter and an arbitrary waveform generator (AWG) modulator. The ASE source is for generating a continuous wave (CW) broadband pulse. The spectral filter is coupled with the ASE source for narrowing the CW broadband pulse and the AWG modulator is coupled with the spectral filter for shaping the narrowed CW broadband pulse to an arbitrary pulse shape.

In accordance with another embodiment of the disclosed technique, there is thus provided a fiber laser amplifier for arbitrary pulse shaping. The fiber laser amplifier comprises a seeder and an amplifier. The seeder is coupled with the amplifier. The seeder is for generating an arbitrary shaped pulse and the amplifier is for amplifying the arbitrary shaped pulse. The seeder includes an amplified spontaneous emission (ASE) source, a spectral filter and an arbitrary waveform generator (AWG) modulator. The ASE source is for generating a continuous wave (CW) broadband pulse. The spectral filter is coupled with the ASE source for narrowing the CW broadband pulse and the AWG modulator is coupled with the spectral filter for shaping the narrowed CW broadband pulse to an arbitrary pulse shape.

BRIEF DESCRIPTION OF THE DRAWINGS

The disclosed technique will be understood and appreciated more fully from the following detailed description taken in conjunction with the drawings in which:

FIG. 1A is a graph showing a rectangular pulse after amplification exhibiting gain depletion, as is known in the prior art;

FIG. 1B is a graph showing an SBS generated pulse produced by amplifying a linear rising pulse, as is known in the prior art;

FIG. 2 is a schematic illustration of a fiber laser amplifier for generating arbitrary pulse shapes, constructed and operative in accordance with an embodiment of the disclosed technique;

DETAILED DESCRIPTION OF PREFERRED EMBODIMENTS

Figure 3A:
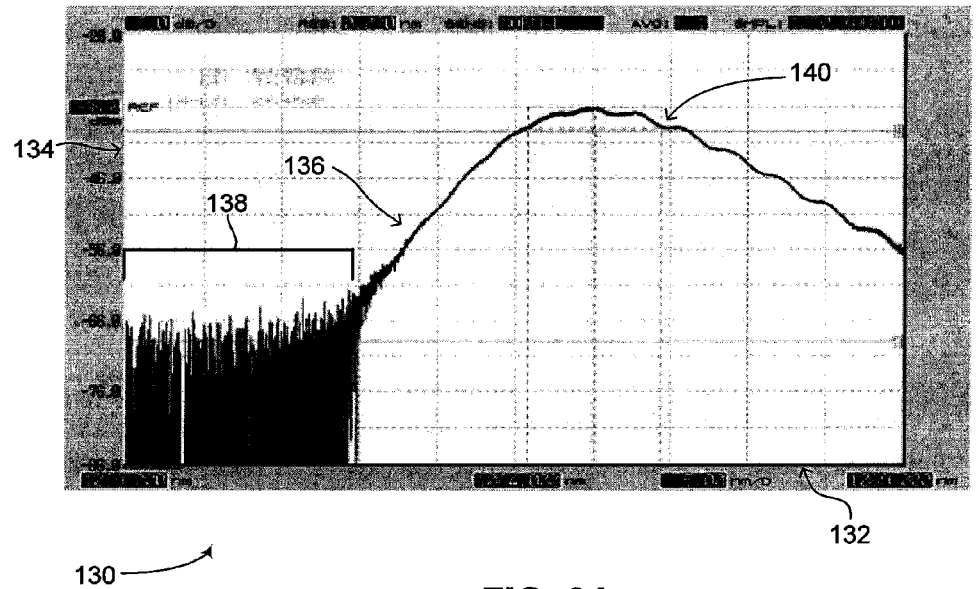
FIG. 3A is a graph of the seeder of FIG. 2 before spectral filtering, constructed and operative in accordance with another embodiment of the disclosed technique.

The disclosed technique overcomes the disadvantages of the prior art by employing a novel system and method for achieving arbitrary pulse waveforms, i.e. arbitrary pulse shaping, at high peak powers exhibiting a significantly higher SBS limiting threshold. According to the disclosed technique, a MOPA fiber laser is provided wherein SBS imposes no limitation over the pulse shape, thus allowing the extraction of high peak powers and high energy pulses. A MOPA fiber laser according to the disclosed technique includes at minimum an oscillator which is amplified. The oscillator may be embodied as a seeder or seed laser.

In order to circumvent the gain saturation of the medium from limiting the possible energy of the generated pulses, the saturation of an amplifier in a fiber laser is controlled. Control over the saturation of the amplifier can be achieved by shaping the laser pulses generated by a seeder in a MOPA fiber laser using a slowly rising shape. Such a shape can compensate for gain saturation of the amplifier. While extreme pulse shaping reduces the SBS threshold, designing the spectral characteristics of the laser pulse can lift the SBS barrier by increasing the threshold significantly, thus enabling the extreme shaping needed for overcoming gain saturation.

Reference is now made to FIG. 2, which is a schematic illustration of a fiber laser amplifier for generating arbitrary pulse shapes, generally referenced 100, constructed and operative in accordance with an embodiment of the disclosed technique. FIG. 2 illustrates a novel seeder with spectral characteristics that is designed to overcome the issues of gain saturation and SBS limitation as described in the prior art. Fiber laser amplifier 100 includes a seeder 102 and an amplifier 104. Seeder 102 can be embodied as any kind of oscillator. Seeder 102 includes an amplified spontaneous emission (herein abbreviated ASE) source 106, a spectral filter 108 and an arbitrary waveform generator (herein abbreviated AWG) modulator 110. ASE source 106 is coupled with spectral filter 108, which in turn is coupled with AWG modulator 110. Modulator 110 is coupled with amplifier 104. Seeder 102 is shown coupled with amplifier 104, which may be a single amplification stage or a multiple amplification stage, depending on what peak power is desired for the laser pulses generated by fiber laser amplifier 100.

ASE source 106 is a source of amplified spontaneous emission which includes a plurality of frequencies by generating a broad range of wavelengths depending on the characteristics of the gain medium. Each frequency thus only carries a fraction of the energy generated by ASE source 106. According to the disclosed technique, by spreading out the energy per frequency generated by ASE source 106, no one frequency produces a sufficiently high peak power for a specific wavelength to which it can lock and interact with the gain medium to generate the SBS pulse. In this respect, SBS pulses in seeder 102 will not be generated and will not be amplified to intensity levels wherein SBS can cause internal laser damage. ASE source 106 is thus a broadband light source and is operated in a continuous wave (herein abbreviated CW) mode. According to the disclosed technique, ASE source 106 as a broadband light source is any light source having a bandwidth which ranges at least tens of nanometers and is also broad in the sense that the spectrum is full and continuous, i.e. not being made up of a fine structure which merely forms a broad envelope. ASE source 106 can be a fiber coupled semiconductor gain medium with an anti-reflection coating, thus ensuring low or no optical feedback, such as a semiconductor optical amplifier (herein abbreviated SOA) or a superluminescent diode (herein abbreviated SLD). ASE source 106 can also be a weakly pumped rare-earth doped optical fiber terminated to ensure low or no optical feedback. ASE source 106 can also be a CW laser which is pumped with a seed laser, such as a pump diode, having a broad frequency spectrum. ASE source 106 can be specifically constructed or can be a readymade, off-the-shelf light source fulfilling the characteristics listed above, such as white light or a radiation source have a wavelength of approximately 1064 nanometers. It is noted that ASE source 106 is not a narrowband seeder as is used in the prior art.

The broadband CW light generated by ASE source 106 is passed to spectral filter 108 for filtering the broadband light to obtain a desired bandwidth. Spectral filter 108 may be a band-pass filter (herein abbreviated BPF), a notch filter, a circulator, a fiber Bragg grating (herein abbreviated FBG), a free space filter using coated optics or a Bragg mirror. The broadband light may be filtered for a specific bandwidth depending on the use of fiber laser amplifier 100. For example, in applications that require second harmonic generation, spectral filter 108 may be very narrow, resulting in laser pulses having a linewidth in the sub-nanometer range. In applications which are not as sensitive to wavelength, such as scribing and marking, spectral filter 108 may be slightly broader, resulting in laser pulses having a linewidth in the range of a few nanometers. It is noted that even though spectral filter 108 produces light within a specified bandwidth, the nature of the laser pulse is still a broadband light, thus increasing the threshold for SBS significantly. This is explained in greater detail below in FIG. 3B.

The light from spectral filter 108 is then shaped and amplified in AWG modulator 110 to form the desired pulse and its shape. AWG modulator 110 enables a plurality of shapes to be given to the generated laser pulse such as square, ramped, pulse train, pulse bursts, exponentially rising edge pulse and tailored waveforms which are application specific. The pulse train shape can be of any number of cycles. AWG modulator 110 can generate arbitrary waveforms and therefore is not limited to the pulse shapes it can generate. As mentioned above, AWG modulator 110 also amplifies the pulse shaped laser pulse. The output of AWG modulator 110 is then provided to amplifier 104, which can then amplify the laser pulse to a desired peak power tailored to compensate for gain saturation without ever reaching the SBS threshold.

Reference is now made to FIG. 3A, which is a graph of the seeder of FIG. 2 before spectral filtering, generally referenced 130, constructed and operative in accordance with another embodiment of the disclosed technique. Graph 130 shows the spectral distribution of a laser light produced by seeder 102 (FIG. 2), in particular by ASE source 106 (FIG. 2). An X-axis 132 represents wavelength, whereas a Y-axis 134 represents power spectral density (herein abbreviated PSD). A curve 136 is shown illustrating the spectral distribution of the aforementioned laser pulse. As seen, a section 140 of the laser light has a peak shape spanning a certain wavelength range, whereas a section 138 of the laser light has an almost equal PSD spread over a certain wavelength range. As shown in FIG. 3A, the laser light produced by ASE source 106 is a broadband signal with energy in the signal spread out over a full broadband of frequencies.

Figure 3B:
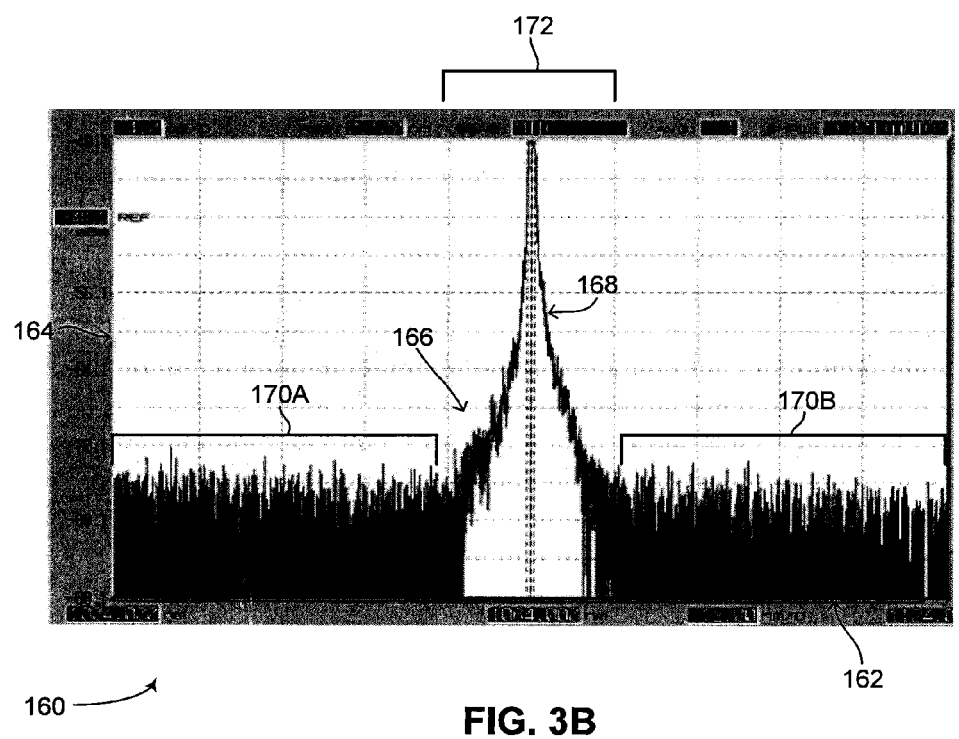
FIG. 3B is a graph of the seeder of FIG. 2 after spectral filtering, constructed and operative in accordance with a further embodiment of the disclosed technique.

Reference is now made to FIG. 3B, which is a graph of the seeder of FIG. 2 after spectral filtering, generally referenced 160, constructed and operative in accordance with a further embodiment of the disclosed technique. Graph 160 shows the spectral distribution of a laser light produced by seeder 102 (FIG. 2), in particular after spectral filtering by spectral filter 108 (FIG. 2). An X-axis 162 represents wavelength], whereas a Y-axis 164 represents PSD. A curve 166 is shown illustrating the spectral distribution of the aforementioned laser light. Shown in the graph is a central peak 168, which delineates a bandwidth 172 of frequencies which spectral filter 108 allows to pass through. Sections 170A and 170B represent frequencies of the laser light which are not allowed to pass through spectral filter 108. As shown in FIG. 3B, the light exiting spectral filter 108 still has the characteristics of a broadband signal with energy in the signal spread out over the frequencies in bandwidth 172. However the signal is nonetheless narrower than the signal shown in FIG. 3A, thus enabling pulse shaping to occur which can produce laser pulses with high peak power.

Figure 3C:
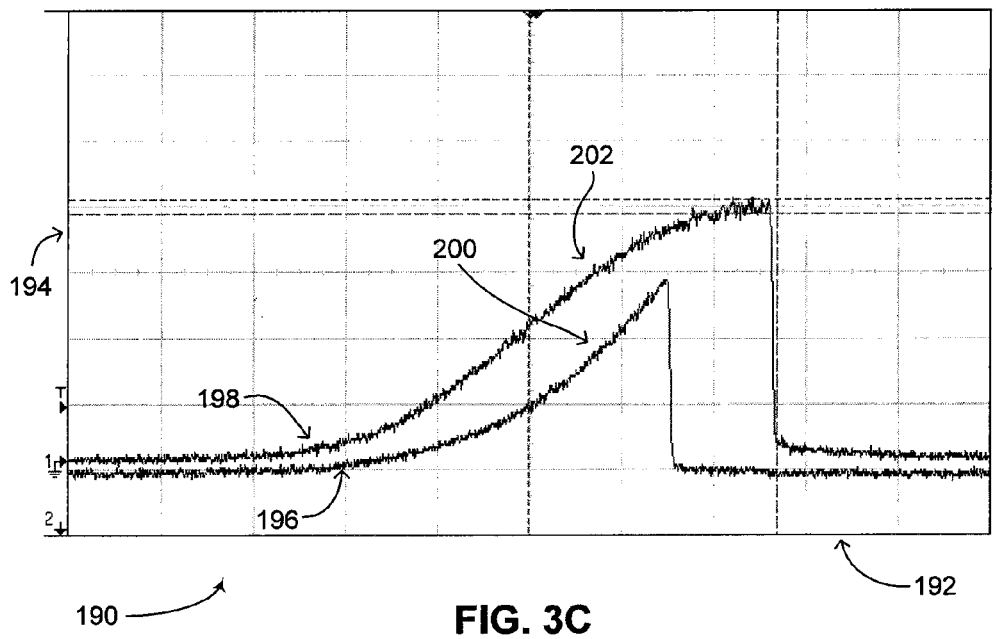
FIG. 3C is a graph showing an amplified rising pulse using the seeder of FIG. 2, constructed and operative in accordance with another embodiment of the disclosed technique.

Reference is now made to FIG. 3C, which is a graph showing an amplified rising pulse using the seeder of FIG. 2, generally referenced 190, constructed and operative in accordance with another embodiment of the disclosed technique. Graph 190 shows the voltage of two laser pulses over time, generated by the fiber laser amplifier of the disclosed technique. An X-axis 192 represents time in nanoseconds whereas a Y-axis 194 represents voltage in millivolts, substantially representing the peak power of the laser pulses. As shown, a first curve 196 is produced by ASE source 106 (FIG. 2) and a second curve 198 is produced by AWG modulator 110. Second curve 198 has been amplified to a peak power of approximately 10 kilowatts. First curve 196 as produced by ASE source 106 has a controlled rising shape 200. As explained above, this shape enables the gain saturation of AWG modulator 110 to be regulated. In prior art fiber lasers, as shown above in FIG. 1B, as the gain saturation of a seeder increases, SBS increases as well, and the increase in SBS increases even quicker and more pronounced in an amplifier. According to the disclosed technique, by using a broadband signal which has been spectrally filtered, an increase in the gain saturation of ASE source 106 does not cause an increase in SBS since the broadband signal prevents SBS from locking onto a specific wavelength and increasing in intensity. Therefore, the broadband signal can be amplified to high peak powers without approaching the SBS threshold. In addition, since the spectral filtering reduces the bandwidth of the signal (i.e. the laser pulses), without changing the broadband nature of the signal, pulse shaping can occur in a controlled manner, producing single mode laser pulses of arbitrary shape and high peak power. As mentioned above, the fiber laser amplifier of the disclosed technique can be used for a variety of industrial applications, such as non-linear frequency conversion. Examples can include second harmonic generation, third harmonic generation and sum-frequency generation.

Figure 4:
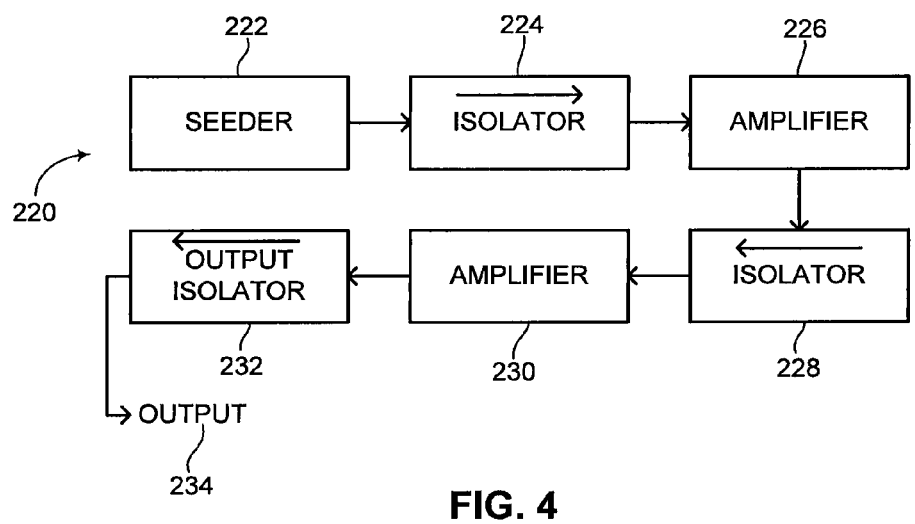
FIG. 4 is a schematic illustration of a MOPA fiber laser using the seeder of FIG. 2, constructed and operative in accordance with a further embodiment of the disclosed technique.

Reference is now made to FIG. 4, which is a schematic illustration of a MOPA fiber laser using the seeder of FIG. 2, generally referenced 220, constructed and operative in accordance with a further embodiment of the disclosed technique. MOPA fiber laser 220 represents a possible use of the seeder of FIG. 2 in a fiber laser amplifier. MOPA fiber laser 220 includes a seeder 222, a first isolator 224, a first amplifier 226, a second isolator 228, a second amplifier 230 and an output isolator 232. First isolator 224 is coupled with seeder 222 and first amplifier 226. Second isolator 228 is coupled with first amplifier 226 and second amplifier 230. Output isolator 232 is coupled with second amplifier 230 and outputs laser pulses as shown by an output 234. First isolator 224, first amplifier 226, second isolator 228, second amplifier 230 and output isolator 232 together represent an embodiment of amplifier 104 (FIG. 2). Seeder 222, as described above in FIG. 2, can produce arbitrary pulse waveforms which are unrestricted by SBS. Therefore, after the laser pulses are passed through first isolator 224, first amplifier 226 and second amplifier 230 can be used to amplify the peak power of the laser pulses well above 10 kilowatts with a pulse energy in the millijoule range. The spectral and temporal shapes of the output pulses are also suited for further amplifications and are unlimited by the SBS threshold.

It will be appreciated by persons skilled in the art that the disclosed technique is not limited to what has been particularly shown and described herein above. Rather the scope of the disclosed technique is defined only by the claims, which follow.

The invention claimed is:

1. Seeder for use with a fiber amplifier, the seeder being, for generating a shaped pulse having an increased Stimulated Brillouin Scattering (SBS) threshold, said shaped pulse can be used to generate high energy laser pulses, comprising:
   an amplified spontaneous emission (ASE) source, for generating a broadband continuous wave (CW) light having a continuous spectral distribution comprising a plurality of frequencies, each one of said plurality of frequencies carrying a fraction of the energy of said broadband CW light;
   a spectral filter, coupled with said ASE source, for narrowing a bandwidth of said broadband CW light while maintaining said continuous spectral distribution within said narrowed bandwidth; and
   an arbitrary waveform generator (AWG) modulator, coupled with said spectral filter, for shaping said narrowed bandwidth broadband CW light in a controlled manner to a pulse shape having a gradually rising edge,
   wherein said continuous spectral distribution of said narrowed bandwidth broadband CW light enables said pulse shape to have said increased SBS threshold.

2. The seeder according to claim 1, wherein said seeder is coupled with an amplifier thus forming a master oscillator power amplifier (MOPA).

3. The seeder according to claim 1, wherein said broadband CW light generated said ASE source comprises a full continuous spectrum within a predefined bandwidth.

4. The seeder according to claim 3, wherein said predefined bandwidth is tens of nanometers.

5. The seeder according to claim 1, wherein said seeder is an oscillator.

6. The seeder according to claim 1, wherein said ASE source is selected from the list consisting of:
   a fiber coupled semiconductor gain medium with an anti-reflection coating;
   a semiconductor optical amplifier (SOA);
   a superluminescent diode (SLD);
   a weakly pumped rare-earth doped optical fiber terminated for at least minimum optical feedback;
   a continuous wave (CW) laser pumped with a seed laser;
   a pump diode having a broad frequency spectrum;
   a white light; and
   a radiation source have a wavelength of approximately 1064 nanometers.

7. The seeder according to claim 1, wherein said spectral filter is selected from the list consisting of:
   a band-pass filter;
   a notch filter;
   a circulator;
   a fiber Bragg grating;
   a free space filter using coated optics; and
   a Bragg mirror.

8. The seeder according to claim 1, wherein said pulse shape having a gradually rising edge is selected from the list consisting of:
   ramped; and
   exponentially rising edge pulse.

9. The seeder according to claim 1, wherein said AWG modulator also amplifies said narrowed bandwidth broadband CW light.

10. The seeder according to claim 1, wherein said seeder is coupled with a fiber laser amplifier, for amplifying said shaped pulse.

11. The seeder according to claim 10, wherein said fiber laser amplifier is a single amplification stage.

12. The seeder according to claim 10, wherein said fiber laser amplifier is a multiple amplification stage.

13. Fiber laser for to generating high energy laser pulses, comprising:
    a seeder, for generating a shaped pulse having an increased Stimulated Brillouin Scattering (SBS) threshold; and
    at least one amplifier, coupled with said seeder, for amplifying said shaped pulse to a high energy laser pulse,
    said seeder comprising:
    an amplified spontaneous emission (ASE) source, for generating a broadband continuous wave (CW) light having a continuous spectral distribution comprising a plurality of frequencies, each one of said plurality of frequencies carrying a fraction of the energy of said broadband CW light;
    a spectral filter, coupled with said ASE source, for narrowing a bandwidth of said broadband CW light while maintaining said continuous spectral distribution within said narrowed bandwidth; and
    an arbitrary waveform generator (AWG) modulator, coupled with said spectral filter, for shaping said narrowed bandwidth broadband CW light in a controlled manner to a pulse shape having a gradually rising edge,
    wherein said continuous spectral distribution of said narrowed bandwidth broadband CW light enables said pulse shape to have said increased SBS threshold.

14. The fiber laser according to claim 13, wherein said broadband CW light generated by said ASE source comprises a full continuous spectrum within a predefined bandwidth.

15. The fiber laser according to claim 14, wherein said predefined bandwidth is tens of nanometers.

16. The fiber laser according to claim 13, wherein said seeder is an oscillator.

17. The fiber laser according to claim 13, wherein said ASE source is selected from the list consisting of:
    a fiber coupled semiconductor gain medium with an anti-reflection coating;
    a semiconductor optical amplifier (SOA);
    a superluminescent diode (SLD);
    a weakly pumped rare-earth doped optical fiber terminated for at least minimum optical feedback;
    a continuous wave (CW) laser pumped with a seed laser;
    a pump diode having a broad frequency spectrum;
    a white light; and
    a radiation source having a wavelength of approximately 1064 nanometers.

18. The fiber laser according to claim 13, wherein said spectral filter is selected from the list consisting of:
    a band-pass filter;
    a notch filter;
    a circulator;
    a fiber Bragg grating;
    a free space filter using coated optics; and
    a Bragg mirror.

19. The fiber laser according to claim 13, wherein said pulse shape having a gradually rising edge is selected from the list consisting of:
  ramped; and
  exponentially rising edge pulse.

20. The fiber laser according to claim 13, said at least one amplifier comprising:
  at least one isolator; and
  a respective at least one amplifier,
    wherein said at least one isolator is coupled between said seeder and said respective at least one amplifier.

21. The fiber laser according to claim 13, wherein said at least one amplifier is selected from the list consisting of:
  a single amplification stage amplifier; and
  a multiple amplification stage amplifier.

* * * * *